United States Patent
Morin et al.

(10) Patent No.: US 6,710,709 B1
(45) Date of Patent: Mar. 23, 2004

(54) MOTOR VEHICLE SAFETY LIGHTS

(76) Inventors: Louis F. Morin, 121 Bellevue Ave., Springfield, MA (US) 01108; Merribeth J. Morin, 106 Bellevue Ave., Springfield, MA (US) 01108

( * ) Notice: Subject to any disclaimer, the term of this patent is extended or adjusted under 35 U.S.C. 154(b) by 0 days.

(21) Appl. No.: 09/541,554

(22) Filed: Apr. 3, 2000

(51) Int. Cl.⁷ .................................................. B60Q 1/26
(52) U.S. Cl. .................... 340/468; 340/467; 340/464; 340/466; 340/463; 340/471; 340/472; 340/479
(58) Field of Search ................................ 340/467, 468, 340/463, 464, 466, 471, 472, 479

(56) References Cited

U.S. PATENT DOCUMENTS

| | | | |
|---|---|---|---|
| 4,556,862 A | 12/1985 | Meinershagen | 340/67 |
| 5,089,805 A | 2/1992 | Salsman | 340/467 |
| 5,172,095 A * | 12/1992 | Scott | 340/479 |
| 5,684,474 A | 11/1997 | Gilon et al. | 340/903 |
| 5,712,617 A | 1/1998 | Quan | 340/467 |
| 5,736,926 A | 4/1998 | Winholtz | 340/479 |
| 5,831,523 A | 11/1998 | Lange | 340/479 |
| 5,847,513 A * | 12/1998 | Host | 315/80 |
| 6,411,204 B1 * | 6/2002 | Bloomfield et al. | 340/467 |

* cited by examiner

Primary Examiner—Daryl Pope
(74) Attorney, Agent, or Firm—McCormick, Paulding & Huber LLP

(57) ABSTRACT

Circuitry and/or device(s) provide a flashing or blinking light in the rear of a vehicle to alert others of a reduction in speed or directional change to substantially increase driver and passenger safety while travelling.

6 Claims, 4 Drawing Sheets

MOTOR VEHICLE SAFETY LIGHTS

BACKGROUND OF THE INVENTION

1. Field of the Invention

The invention relates to vehicle safety or warning lights.

2. Description of the Related Art

The prior art discloses a wide variety of warning lights to signal vehicle stopping or turning. However, as far as we are aware, all require modification of the vehicle by the addition of more lights, or lamps, or added circuitry, or special equipment.

In about the mid-1980's, motor vehicles were mandated by law to have a third brake light centrally located in the rear of the vehicle. The intent of this law was mainly, if not solely, to alert the driver of a trailing vehicle that brakes were being applied. Its potential as a safety device has not been fully exploited.

Presently, the vehicle rear brake lights stay on continuously when activated. Oftentimes, this is not noticeable to the trailing driver for a number of reasons, which may include boredom, distraction, inexperience, age, medicinal effect, etc. The situation may be further compounded when the leading car lights are on, whether it be day or night. The blending of night lights and brake lights can become difficult to differentiate. This problem is further intensified under adverse weather conditions.

On occasion brake or signal lights fail, usually by burning out, laving the driver of a trailing vehicle without any warning of vehicle braking or direction change.

An additional factor that further exacerbates this problem is the variety of arrangements of rear lights that exist on vehicles today. The variances in many car light designs may hamper the ability to distinguish brake lights from other rear lights.

It is common knowledge that many drivers pump their brakes to make the vehicle brake lights flash in order to warn the driver of a trailing vehicle to be on guard for a potential driving hazard. It is important to note that this pumping action lengthens the stopping distance and, therefore, cannot always be used to warn the driver of a trailing vehicle without potentially causing a collision between the vehicles.

Anti-lock brakes are also of special concern because pumping these braking devices is contraindicated. Therefore, when driving a vehicle equipped with antilock brakes, the driver is not able to warn the driver of the trailing vehicle of a potential driving hazard.

In present day vehicles, movement of the vehicle in reverse is indicated by steady white rear lights which may not be readily visible in daylight, or by an audible signal which may not be heard by the hearing impaired.

BRIEF SUMMARY OF THE INVENTION

A primary object of the invention is the provision of circuitry and/or device(s) for providing a flashing or blinking light in the rear of a vehicle to alert others of a reduction in speed or directional change, thereby substantially increasing driver and passenger safety while travelling.

By means of the present invention, with little additional cost to vehicle owners or manufacturers, while utilizing existing vehicle equipment, the effectiveness of the vehicle mandated safety equipment can be greatly enhanced.

Herein, the addition of a flashing or blinking means to the brake lights enhances the indication that the vehicle is stopping or turning, increasing driver safety without compromising individual car design.

The invention requires no unusual switches or gadgetry and utilizes a flashing or blinking center brake light for signaling braking or turning. For braking only, all brake lights can be placed in a flashing or blinking mode upon activation.

It is well-accepted that all drivers have been indoctrinated to respond quickly to flashing lights, especially red flashing lights. It is a wake-up call to all. The invention hereof is a simple one, utilizing the third brake light as a flashing or blinking device to indicate that a vehicle's brakes are being applied and the vehicle is slowing down. The flashing or blinking third brake light can also be activated when the turn signals are engaged.

The invention provides circuitry modification that will activate the vehicle center rear brake light.

The blinking or flashing light hereof provides double protection to warn the driver of a trailing vehicle that the vehicle in front of him is changing direction.

Use of the present invention is especially important in vehicles equipped with anti-lock brakes, wherein the brakes cannot be "pumped".

In a further embodiment of the invention, a flashing or blinking mechanism in the brake lights is activated when a vehicle is moving in reverse. Activation of the flashing or blinking mechanism will provide a stronger warning mechanism to other drivers and to pedestrians in the vicinity of the vehicle.

As part of this invention, the flashing or blinking lights will not only serve as a warning mechanism to other drivers, but also will provide lighting effect that will not be confused with other flashing light mechanisms currently used on the road. Further, the frequency of the flashing will be such that the time in the "off" position is limited.

Although the present invention describes a relay mechanism added to the existing third brake light, it is also intended to include any type of mechanism that will create the same effect of flashing or blinking of brake lights. For example, it may include the use of a bulb with more than one filament, or more than one adjacent bulb to create a flashing or blinking effectuupon the application of the brakes or the turn signals.

The inventors feel confident that their blinking or flashing mechanism, added to existing brake lights, turn signals, and back-up lights will be so effective in preventing accidents and injury that it will become mandated by law for all newly manufactured vehicles and for retrofitting vehicles presently on the road.

DETAILED DESCRIPTION OF THE INVENTION

Figure 1:
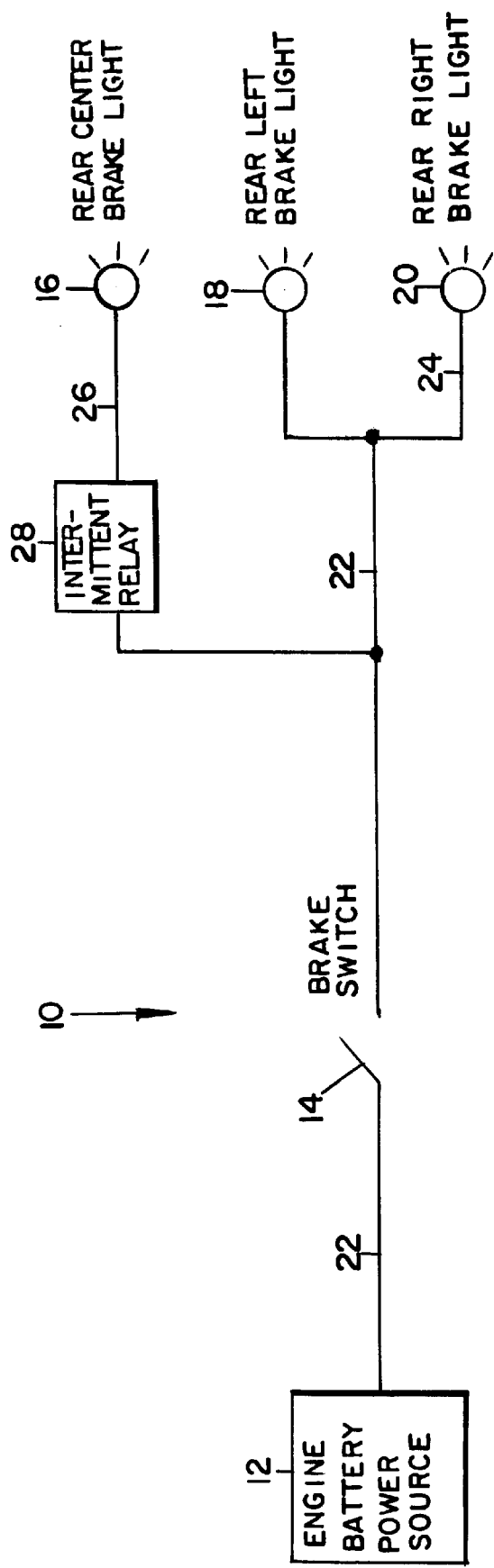
FIG. 1 is a schematic showing of circuitry embodying one form of the invention using an intermittent relay for flashing or blinking a vehicle center brake light.

Referring to FIG. 1, circuitry 10, embodying a first form of the invention, includes a battery 12, a brake switch 14, a rear center brake light 16, a rear left brake light 18 and a rear right brake light 20. Brake switch 14 is disposed in a first line 22 which connects between the battery 12 and a second line 24 which connects between rear left and rear right brake lights 18 and 20 respectively.

A third line 26 connects rear brake light 16 to line 22 at a location between brake switch 14 and rear left and right brake light 18 and 20 respectively.

An intermittent relay 28 is disposed in line 26 so that when brake light switch 14 is activated, center brake light 16 will be flashing or blinking while the rear left and right lights 18 and 20 remain steady.

Intermittent relay 28 may be of the type having a set "on" and "off" interval between flashes; or it may be of the type wherein the "on" and "off" interval between flashes may be adjusted.

Figure 2:
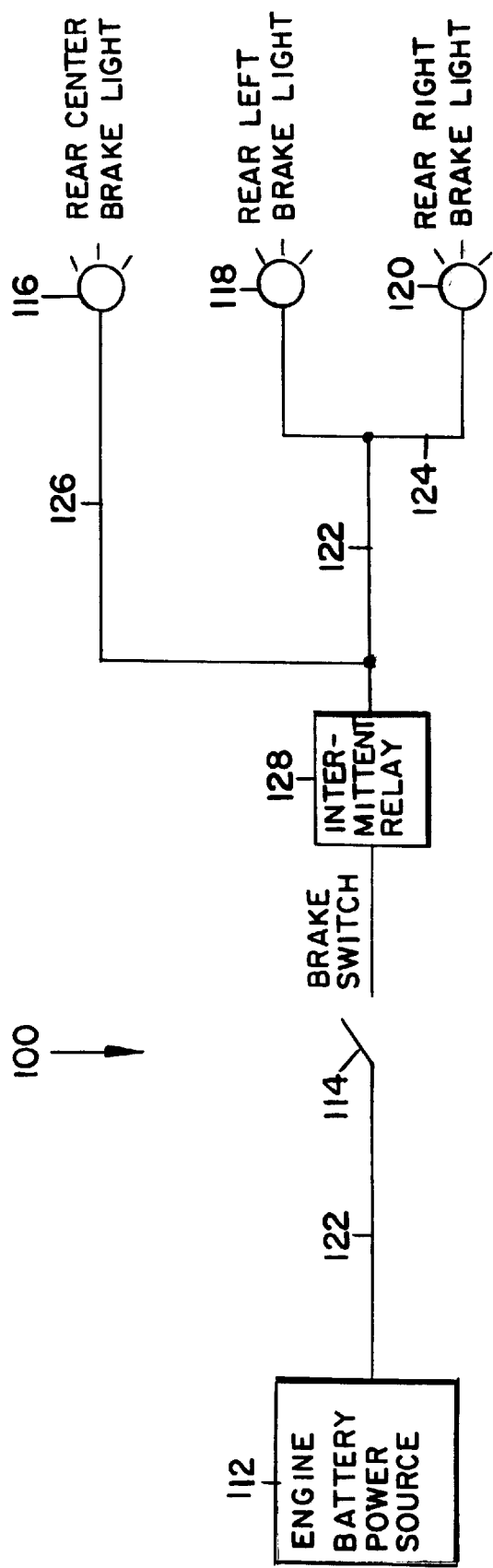
FIG. 2 is a schematic showing of circuitry embodying a second form of the invention using an intermittent relay for flashing or blinking all vehicle brake lights.

Referring to FIG. 2, circuitry 100, embodying a second form of the invention, includes a battery 112, a brake switch 114, a rear center brake light 116, a rear left brake light 118 and a rear right brake light 120. Brake switch 114 is disposed in a first line 122 which connects between battery 112 and a second line 124 which connects between rear left and rear right brake lights 118 and 120 respectively.

A third line 126 connects rear brake light 116 to line 122 at a location between brake switch 114 and rear left and right brake lights 118 and 120 respectively.

An intermittent relay 128 is disposed in line 122 at a location between brake switch 114 and before the connection of line 126 with line 122 so that when brake light switch 114 is activated, center brake light 116 and rear left and right brake lights 118 and 120 will all flash or blink.

Intermittent relay 128 may be of the type having a set "on" and "off" interval between flashes; or it may be of the type wherein the "on" and "off" interval between flashes may be adjusted.

Figure 3:
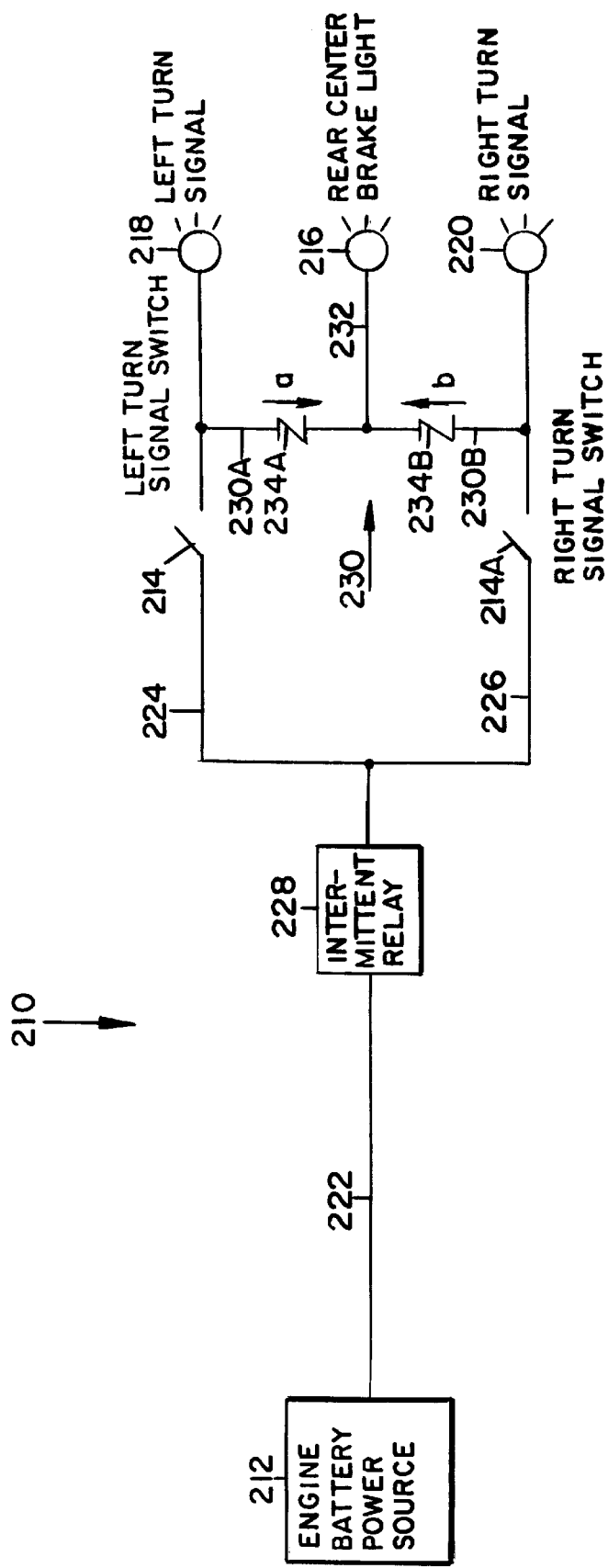
FIG. 3 is a schematic showing of circuitry embodying a third form of the invention wherein the center brake light is connected to the left and right turn signals so that the center brake light will flash or blink when either turn signal is activated.

Referring to FIG. 3, circuitry 210, embodying a third form of the invention, includes a battery 212, a left turn signal switch 214, a right turn signal switch 214A, a rear center brake light 216, a left turn signal 218 and a right turn signal 220.

A first line 222 connects battery 212 to an intermittent relay 228.

Intermittent relay 228 may be of the type having a set "on" and "off" interval between flashes; or it may be of the type wherein the "on" and "off" interval between flashes may be adjusted.

Left turn signal switch 214 is disposed in a second line 224 which is connected at one end to first line 222 and at its opposite end to left turn signal 218.

Right turn signal switch 214A is disposed in a third line 226 which is connected at one end to first line 222 and at its opposite end to right turn signal 220.

A fourth line 230 interconnects second and third lines 224 and 226 respectively, with fourth line 230 being divided into a left turn zone 230A and right turn zone 230B.

A fifth line 232 is connected at one end to fourth line 230 centrally of the latter and is connected at its opposite end to rear center brake light 216.

A first unidirectional switch 234A is disposed in left turn zone 230A and permits current to flow only in one direction, as indicated by the arrow a.

A second unidirectional switch 234B is disposed in right turn zone 230B and permits current to flow only in one direction, as indicated by the arrow b.

In operation, when left turn signal switch 214 is actuated, current passes through line 224 to illuminate left turn signal 218, and current also passes through zone 230A through unidirectional switch 234A, and through line 232 to rear center brake light 216 to illuminate the light, with intermittent relay 228 causing the rear center brake light and the left turn signal to flash or blink.

Alternatively, when right turn signal switch 214A is actuated, current passes through line 226 to illuminate right turn signal 220, and current also passes through zone 230B through unidirectional switch 234B and line 232 to rear center brake light 216 to illuminate the light, with intermittent relay 228 causing the rear center brake light and the right turn signal to flash or blink.

Figure 4:
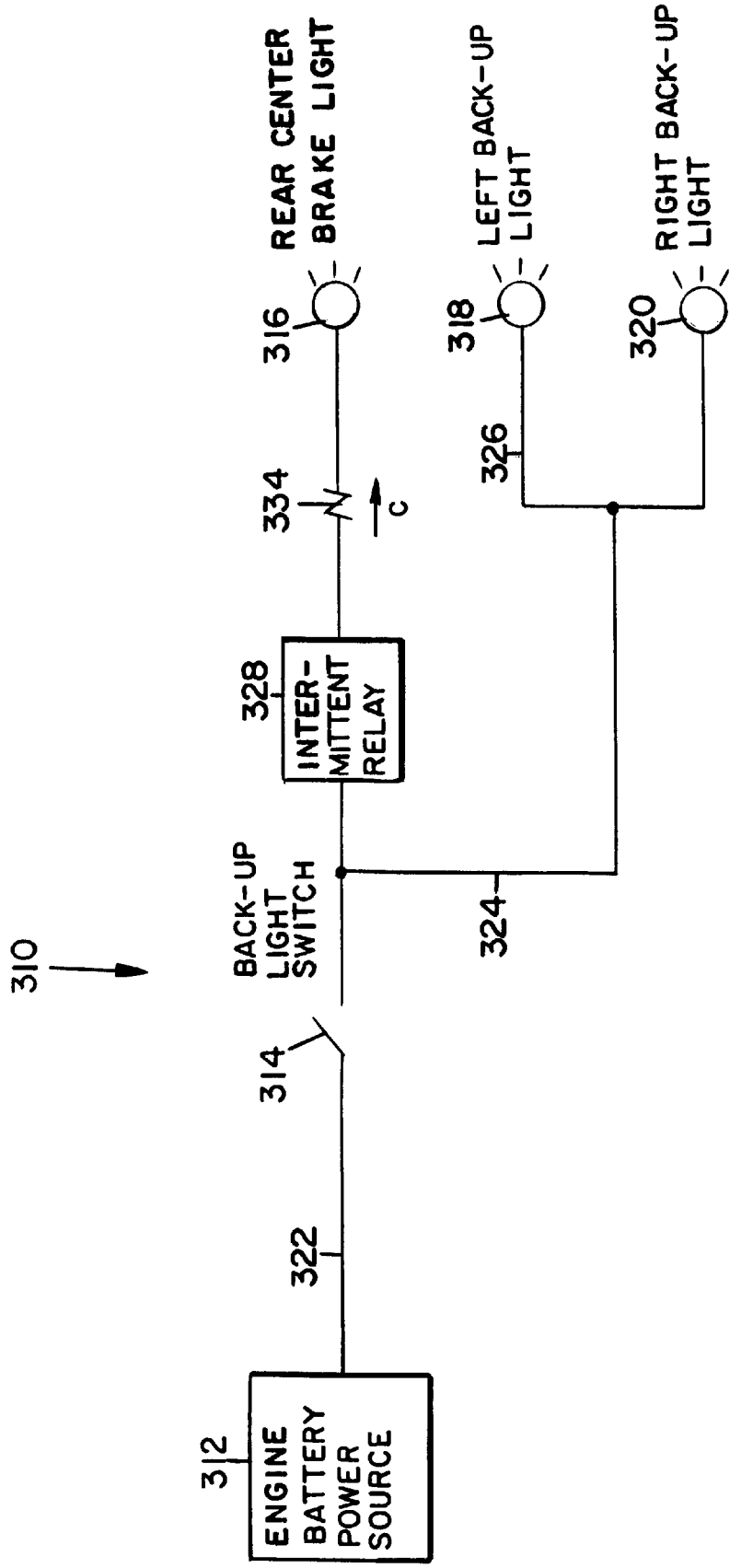
FIG. 4 is a schematic showing of a fourth form of the invention embodying unidirectional circuitry wherein a vehicle center brake light is connected by an intermittent relay to the vehicle back-up lights so that the brake light will flash or blink when the vehicle is in reverse.

Referring to FIG. 4, circuitry 310, embodying a fourth form of the invention, includes a battery 312, a back-up light switch 314, a rear center brake light 316, a left back-up light 318 and a right back-up light 320.

Back-up light switch 314 is disposed in a first line 322 which connects between battery 312 and rear center brake light 316.

An intermittent relay 328 is disposed in first line 322 after back-up light switch 314.

Intermittent relay 328 may be of the type having a set "on" and "off" interval between flashes; or it may be of the type wherein the "on" and "off" interval between flashes may be adjusted.

A unidirectional switch 334 is disposed in first line 322 between intermittent relay 328 and rear center brake light 316 and allows current to flow in only one direction, as indicated by the arrow c.

A second line 324 connects at one end to first line 322 between back-up light switch 314 and intermittent relay 328 and is connected at its opposite end to a third line 326 connecting between left and right back-up lights 318 and 320 respectively.

When the vehicle is placed in reverse, back-up light switch 314 is activated and back-up lights 318 and 320 are illuminated; current passing through intermittent relay 328 and unidirectional switch 334 will cause rear center brake light 316 to flash or blink while the vehicle is backing up.

We claim:

1. In a motor vehicle having circuitry inter-connecting between a power source, an existing brake switch, rear right and left brake lights and a center brake light, the improvement which comprises inserting a commercially available, low cost, heavy duty intermittent flasher relay into the existing circuitry at a selected location to effect flashing or blinking of the brake lights when the brake switch is activated.

2. In a motor vehicle according to claim 1, wherein the intermittent relay is so positioned in the circuitry as to effect flashing or blinking of only the center brake light.

3. In a motor vehicle according to claim 1, wherein the intermittent relay is so positioned in the circuitry as to effect flashing or blinking of all brake lights.

4. In a motor vehicle according to claim 1, wherein the intermittent relay is adjustable to vary on and off frequency of flashing.

5. In a motor vehicle according to claim 1, wherein the circuitry further interconnects between the power source, left and right turn switches and left and right turn signals, with the intermittent relay being inserted into the circuitry at a selected location along with a pair of unidirectional switches to effect flashing or blinking of the center brake light and the left or right turn signals when the left or right turn switches are activated.

6. In a motor vehicle according to claim 1, wherein the circuitry further interconnects between the power source, a back-up light switch, and left and right back-up lights, with the intermittent relay being inserted into the circuitry at a selected location along with a unidirectional switch to effect flashing or blinking of the center brake light and the back-up lights when the back-up light switch is activated.

* * * * *